(12) United States Patent
Blanford, Jr. et al.

(10) Patent No.: US 7,769,222 B2
(45) Date of Patent: Aug. 3, 2010

(54) ARC TOOL USER INTERFACE

(75) Inventors: Charles Randall Blanford, Jr., Hansville, WA (US); Barry Eugene Saylor, Kent, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 922 days.

(21) Appl. No.: 11/589,125

(22) Filed: Oct. 27, 2006

(65) Prior Publication Data

US 2008/0101682 A1    May 1, 2008

(51) Int. Cl.
    *G06K 9/00* (2006.01)
(52) U.S. Cl. .................. 382/141; 345/663; 345/665
(58) Field of Classification Search .......... 345/661, 345/663, 665, 650, 652, 654
    See application file for complete search history.

(56) References Cited

U.S. PATENT DOCUMENTS

| | | | |
|---|---|---|---|
| 6,542,180 B1 | 4/2003 | Wasserman | |
| 6,628,285 B1 * | 9/2003 | Abeyta et al. | 345/441 |
| 7,403,211 B2 * | 7/2008 | Sheasby et al. | 345/661 |
| 7,598,968 B2 * | 10/2009 | Connor et al. | 345/661 |
| 2002/0081028 A1 * | 6/2002 | Ikeda | 382/187 |
| 2005/0031191 A1 | 2/2005 | Venkatachalam | |
| 2005/0213807 A1 | 9/2005 | Wasserman | |
| 2006/0093205 A1 | 5/2006 | Bryll | |
| 2006/0171580 A1 * | 8/2006 | Blanford et al. | 382/141 |

FOREIGN PATENT DOCUMENTS

EP   1686367 A2   8/2006
JP   2004-239761 A   8/2004

OTHER PUBLICATIONS

European Search Report dated Feb. 1, 2008, issued in corresponding Application No. EP 07118455.
Motz, H., "Microsoft PowerPoint 97 for Windows 95/98/N," HERDT-Verlag fur Bildungsmedien GmbH, Nackenheim, Germany, Jan. 1999, pp. 116-119.
Wegener, T., "Microsoft Office PowerPoint 2003 for Windows," HERDT-Verlag fur Bildungsmedien GmbH, Bodenheim, Germany, Jan. 18, 2006, pp. 118-119.
"QVPAK 3D CNC Vision Measuring Machine Operation Guide, Version 2.0," Mitutoyo Corporation & Micro Encoder Inc., Kanagawa, Japan, Sep. 1996.
"QVPAK 3D CNC Vision Measuring Machine User's Guide Version 7," Mitutoyo Corporation & Micro Encoder Inc., Kanagawa, Japan, Jan./Sep. 2003.

* cited by examiner

*Primary Examiner*—Brian P Werner
(74) *Attorney, Agent, or Firm*—Christensen O'Connor Johnson Kindness PLLC

(57) ABSTRACT

A combination of arc tool user interface features and operations are provided for efficiently defining an arc tool region of interest in a machine vision inspection system. Multiple distinct types of parameter control features are provide in an arc tool GUI. The distinct types of parameter control features may be distinguished by their relative locations, or by distinct symbols, or the like. One or more of the types of control features may include at least two modes of operation. In one such mode of operation restricted to one type of control feature, a user may change the nominal radius of curvature of the arc tool using a single cursor motion. In another such mode of operation shared by multiple types of control features, a user may rotate the region of interest of the arc tool using a single cursor motion.

20 Claims, 12 Drawing Sheets

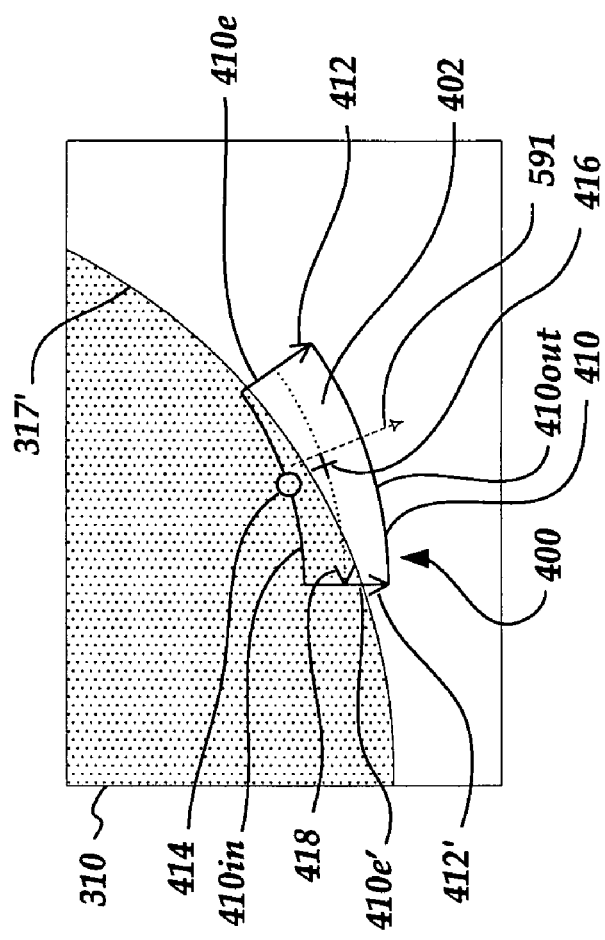
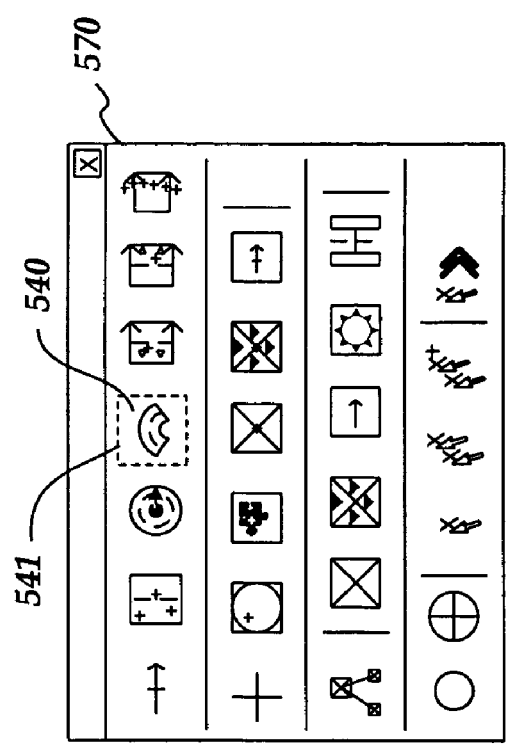
Fig.5B.
Fig.5A.

ARC TOOL USER INTERFACE

FIELD OF THE INVENTION

The invention relates generally to machine vision inspection systems, and more particularly to video metrology tool modes and tools usable to define inspection operations for such systems.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) may be used manually to accomplish manual inspection and/or machine control operations. Their set-up parameters and operation can also be recorded during learn mode, in order to create automatic inspection programs, or "part programs." Such tools may include, for example, edge/boundary detection tools, autofocus tools, shape or pattern matching tools, dimension measuring tools, and the like. For example, such tools are routinely used in a variety of commercially available machine vision inspection systems, such as the QUICK VISION® series of vision systems and the associated QVPAK® software, discussed above.

The currently available features and graphical user interface (GUI) controls for video tools, and particularly dimensional metrology video tools, are limited. In particular, alternatives for setting up video tool regions of interest (ROIs) and operating parameters during learn mode, or manual mode, are limited. Existing alternatives may be difficult to adapt for efficient use with different applications or workpieces. Existing user interfaces may be difficult for users to understand intuitively, making user learning and retention difficult. Video tools that overcome these and other disadvantages, to allow more efficient, intuitive, and flexible use of precision machine vision inspection systems, would be desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Currently, the users of precision machine vision inspection systems may spend a majority of their part-programming time setting up video tools and adjusting their parameters. Thus, even small improvements in their ease-of-use in comparison to their parameter customization capability, their GUI features, and other ergonomic factors, may be highly valued. One type of video tool, a so-called "arc tool" for measuring the characteristics of arc-shaped features in images, may have more controllable parameters than a variety of other video tools. Arc tool customization has been inconvenient and non-intuitive, especially for large and small arc radii. Accordingly, the present invention is directed toward novel and efficient features for configuring an arc video tool in an easy-to-use and flexible manner.

A system and method are provided which allow users to define and/or edit tool parameters for an arc tool ROI with a relatively reduced number of operations. In particular, a unique combination of arc tool user interface features and operations are provided for efficiently editing an arc tool ROI. In accordance with one aspect of the invention, a plurality of distinct types of ROI parameter control features are provide in an arc tool GUI. In one embodiment, there may be at least four such distinct types of ROI control parameter features. The distinct types of ROI parameter control features may be distinguished by their locations relative to the ROI, and/or each other, and/or by distinct symbols, or the like.

In accordance with another aspect of the invention, each distinct type of ROI parameter control feature may be associated with a distinct mode of operation that is specific to that type of ROI parameter control feature. In accordance with a further aspect of the invention, activating such a distinct mode of operation may be associated with displaying a corresponding unique mode symbol cursor. In one embodiment, each of the distinct modes of operation may be activated by an identical activation operation for each of the distinct types of ROI parameter control features. In one embodiment, the identical activation operation comprises hovering a default cursor over a distinct type of ROI parameter control feature until a unique mode symbol cursor is displayed, then activating the corresponding editing mode by depressing the left mouse button while the unique mode symbol cursor is displayed.

In accordance with another aspect of the invention, one distinct mode of operation that is specific to a first type of ROI parameter control feature is a curvature-changing mode, wherein moving a curvature-changing mode symbol cursor along a radial direction causes the nominal radius of curvature of the inner and outer radii of the ROI to mutually decrease or mutually increase, depending on the direction of the radial movement of the curvature-changing mode symbol cursor. In various embodiments, the curvature-changing mode operates such that the end portions of the ROI, retain their original length and pivot about their midpoints, as the nominal radius of curvature changes. In various embodiments, when the difference between the start and stop angles of an ROI is approximately 180 degrees or more, the curvature-changing mode is disabled for that ROI. In various embodiments, the corresponding first type of ROI parameter control feature comprises an editing handle located approximately at the midpoint of at least one of the inner radius boundary of the ROI and the outer radius boundary of the ROI. In one embodiment, the curvature-changing mode symbol cursor may comprise two arc-shaped lines and at least one arrow oriented transverse to the arc-shaped lines.

In accordance with another aspect of the invention, one distinct mode of operation that is specific to a second type of ROI parameter control feature is a symmetrical radial dimension changing mode, wherein moving a symmetrical radial dimension changing mode symbol cursor along a radial direction causes the nominal radius of curvature of the ROI outer radius to increase while the nominal radius of curvature of the ROI inner radius simultaneous decreases by the same amount, or vice versa, depending on the direction of the radial movement of the symmetrical radial dimension changing mode symbol cursor. In one embodiment, the symmetrical radial dimension changing mode operates such that the end portions of the ROI retain their original angles and midpoints, as the nominal radius of curvature changes.

In accordance with a further aspect of the invention, one or more of the distinct types of ROI parameter control features may be associated with at least two modes of operation. One of the two modes of operation may be shared with at least one other distinct type of ROI parameter control feature. In one embodiment, three distinct types of ROI parameter control features are located on each of the inner and outer radius boundaries of the ROI. Each of these distinct types of ROI parameter control features shares an in-place ROI rotation mode of operation. In one embodiment, the in-place ROI rotation mode made be activated by an identical activation operation for each of these distinct types of ROI parameter control features. In one embodiment, the identical activation operation comprises positioning a cursor on one of the distinct types of ROI parameter control features and depressing the right mouse button. In one embodiment, a distinct mode cursor may change to a cursor corresponding to the shared mode that has been activated as a result of depressing the right mouse button.

It should be appreciated the selection of concepts outlined above is exemplary only, and not limiting.

DESCRIPTION OF THE DRAWINGS

The foregoing aspects and many of the attendant advantages of this invention will become more readily appreciated as the same become better understood by reference to the following detailed description when taken in conjunction with the accompanying drawings, wherein:

FIGS. 5A-5B are diagrams illustrating various features related to an arc tool user interface according to this invention, including a tool and/or mode selection bar and a field of view display window, respectively;

DETAILED DESCRIPTION

Figure 1:
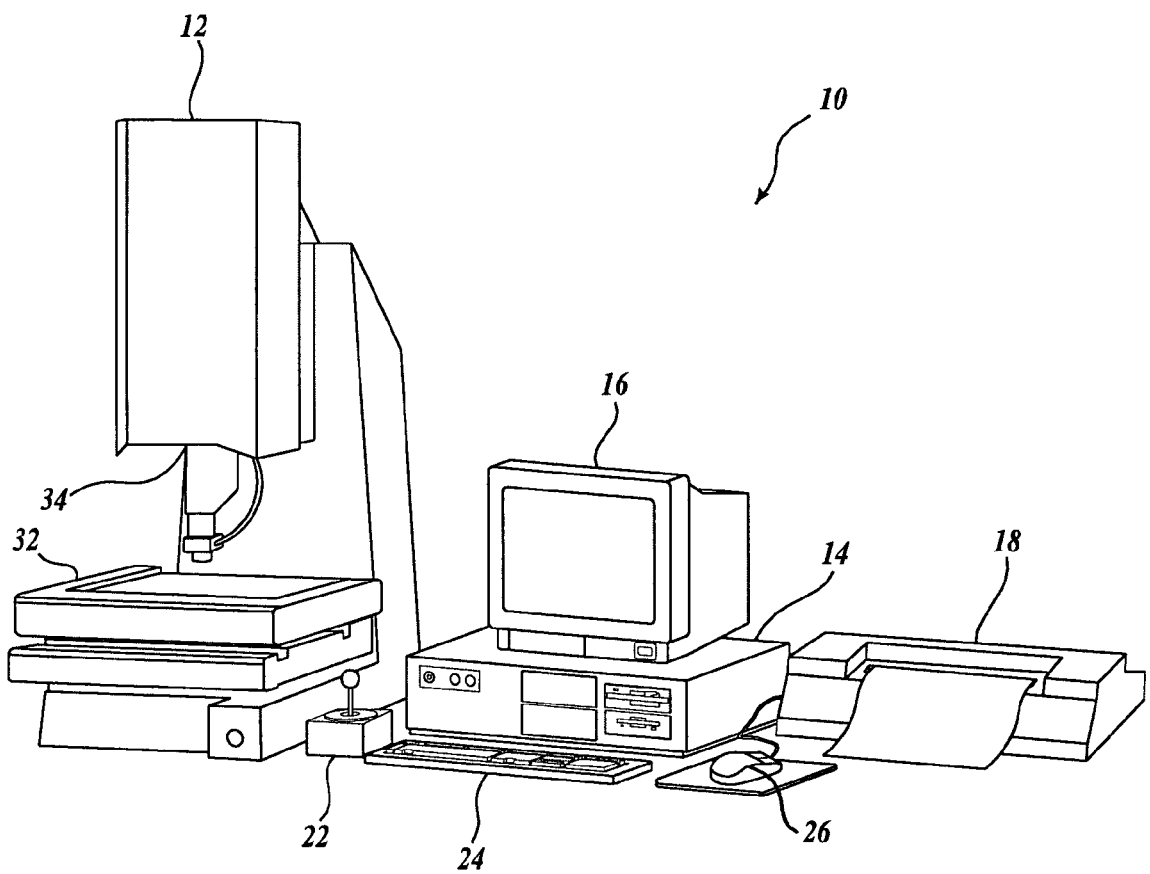
FIG. 1 is a diagram showing various typical components of a general purpose machine vision inspection system.

FIG. 1 is a block diagram of one exemplary machine vision inspection system 10 usable in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in copending and commonly assigned U.S. patent application Ser. No. 10/978,227, which is hereby incorporated herein by reference in its entirety. Various aspects of vision measuring machines and control systems are also described in more detail in copending and commonly assigned U.S. patent application Ser. No. 10/808,948, filed Mar. 25, 2004, and Ser. No. 10/632,823, filed Aug. 4, 2003, which are also hereby incorporated herein by reference in their entirety. As previously indicated, the users of such general purpose precision machine vision inspection systems are often occasional and/or inexperienced users. Such users may spend a majority of their programming time refreshing their understanding of video tools, setting up their ROIs, adjusting their parameters, etc. Thus, even small improvements in the intuitiveness of their graphical user interface and/or their overall ease-of-use, in comparison to their parameter customization capability, their user interface options, and other ergonomic factors, may be highly valued.

Figure 2:
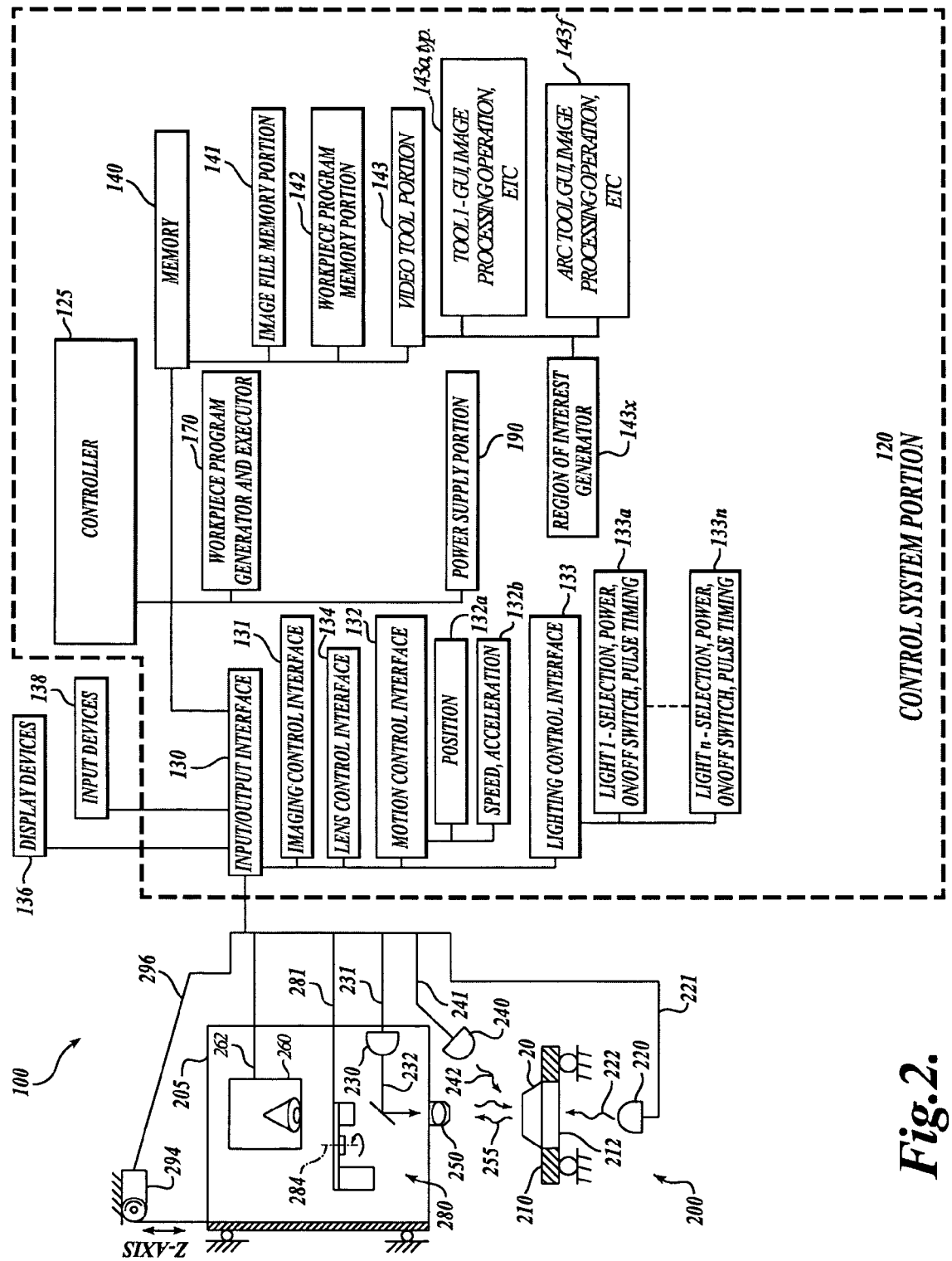
FIG. 2 is a diagram of a control system portion and a vision components portion of a machine vision inspection system.

FIG. 2 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294 that drives an actuator, a connecting cable, or the like, to move the optical assembly portion 205 to change the focus of the image of the workpiece 20 captured by the camera system 260. The controllable motor 294 is connected to the input/output interface 130 via a signal line 296. The term Z axis, as used herein, refers to the axis that is intended to be used for focusing the image obtained by the optical assembly portion 205. A workpiece 20 that is to be imaged using the machine vision inspection system 100 is placed on the workpiece stage 210. One or more of a stage light 220, a coaxial light 230, and a surface light 240 may emit source light 222, 232, or 242, respectively, to illuminate the workpiece 20. The source light is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284, between at least the first and second turret lens positions, via control signals through a signal line or bus 281.

As shown in FIG. 2, in various exemplary embodiments, the control system portion 120 includes a controller 125, an input/output interface 130, a memory 140, a workpiece program generator and executor 170, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100, such as the light sources 220, 230, and 240.

The memory 140 includes an image file memory portion 141, a workpiece program memory portion 142 that may include one or more part programs, or the like, and a video tool portion 143. The video tool portion 143 includes a video tool portion 143a, "TOOL1", that typifies a plurality of other similar tool portions (not shown), which determine the GUI, image processing operation, etc., for each of the corresponding tools. The video tool portion 143 also includes a region of interest generator 143x that supports automatic, semi-automatic and/or manual operations that define various ROIs that are operable in various video tools included in the video tool portion 143.

In particular, in various embodiments according to this invention, the video tool portion 143 includes the arc tool portion 143f, which provides various operations and features as disclosed herein, which define the arc tool user interface and/or which are usable to determine the parameters for various specific instances of applying the arc tool operations to specific workpiece features, as described in greater detail below.

In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130. The memory portion 140 also contains data defining a graphical user interface operable through the input/output interface 130.

The signal lines or busses 221, 231, and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera system 260, and/or to directly control the vision system components portion 200. In a fully automated system having a predefined part program (or workpiece program), the display devices 136 and/or the input devices 138 may be omitted.

In various exemplary embodiments, when a user utilizes the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence, setting light levels and the like, such that the workpiece program instructions capture the training sequence. This process is repeated for multiple images in a set of images that are to be captured. These instructions, when executed, will cause the machine vision inspection system to manipulate the workpiece stage 210 and/or the camera system 260 at certain speed(s) such that a particular portion of the workpiece 20 is within the field of view of the camera system 260 and at a desired focus state for each of a set of images to be acquired.

Once a set of workpiece image acquisition instructions are defined, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136.

The control system portion 120 is further usable to recall captured and stored workpiece inspection images, to inspect and analyze workpiece features in such workpiece inspection images, and to store and/or output the inspection results. These analysis and inspection methods are typically embodied in various video tools included in the video tool portion 143 of the memory 140, including the arc tool portion 143f. After the image inspection/analysis operations using one or more of these video tools are completed, the control system 120 outputs the results of each analysis/inspection operation to the input/output interface for outputting to various display devices 136, such as a video display, printer, and the like. The control system 120 may also store the results of each inspection operation in the memory 140.

Figure 3:
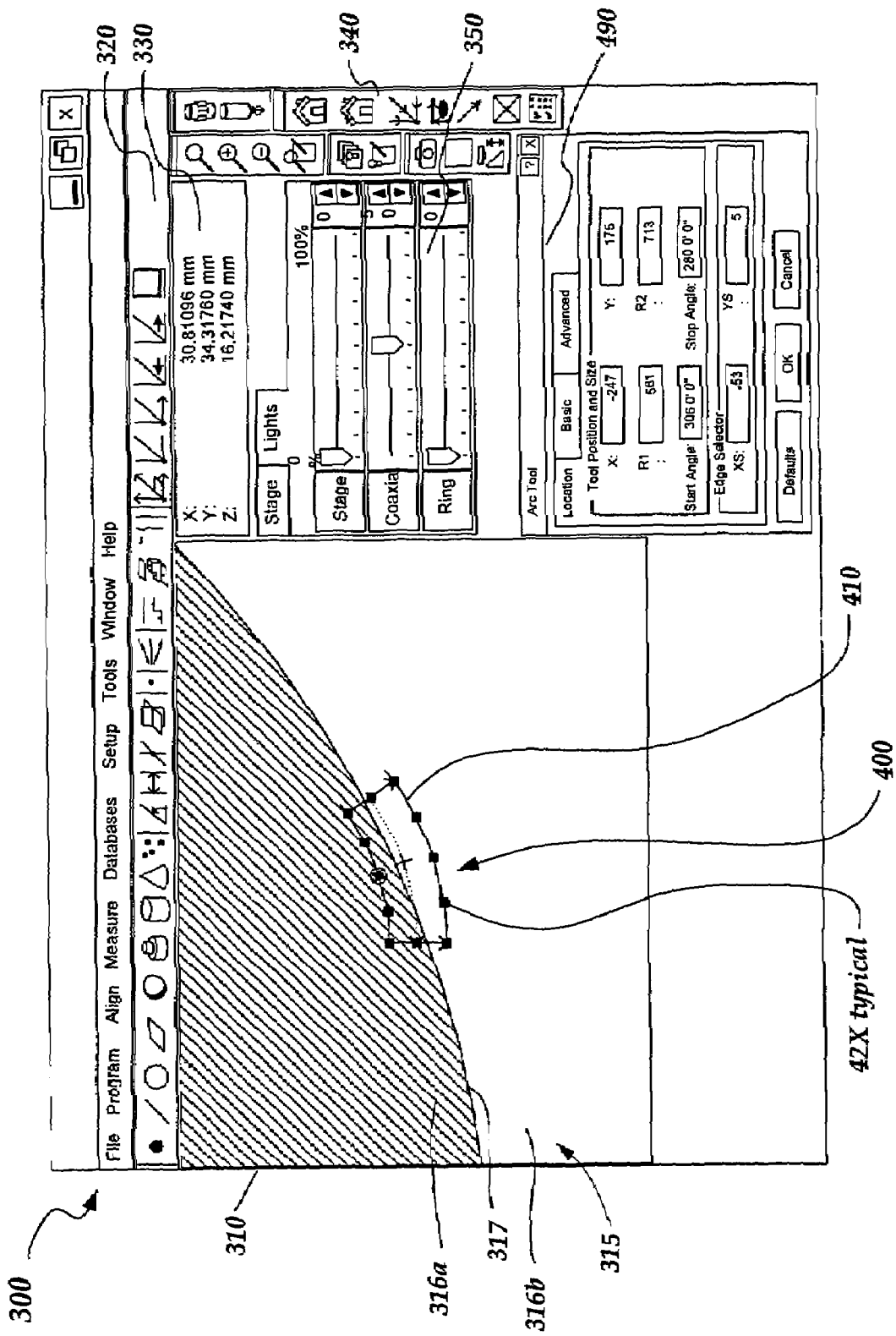
FIG. 3 is a diagram illustrating one embodiment of a machine vision inspection system user interface display including various tool features associated with an arc tool according to this invention.

FIG. 3 is a diagram illustrating one embodiment of a machine vision inspection system user interface display 300 including one exemplary arrangement of various features associated with an arc tool. In the exemplary state shown in FIG. 3, the user interface display 300 includes a field of view (FOV) window 310 that displays a workpiece image 315 that includes two surfaces 316a and 316b that abut one another along an edge 317. The user interface 300 also includes various measurement and/or operation selection bars such as the selection bars 320 and 340, a real-time X-Y-Z (position) coordinate window 330, and a light control window 350.

The FOV window 310 includes one exemplary instance of an arc tool 400 superimposed upon the workpiece image 315. The appearance of editing handles 42X indicates that the arc tool 400 has been selected by a user for editing. In various embodiments, when the user selects an arc tool ROI for editing (e.g., by positioning a cursor in the tool ROI and clicking a left mouse button, or the like), editing handles 42X may be displayed or highlighted on the ROI boundary 410, and/or the user interface may automatically display an arc tool parameter dialog box, such as the parameter dialog box 490 described in greater detail below, or an analogous dialog box.

Figure 4B:
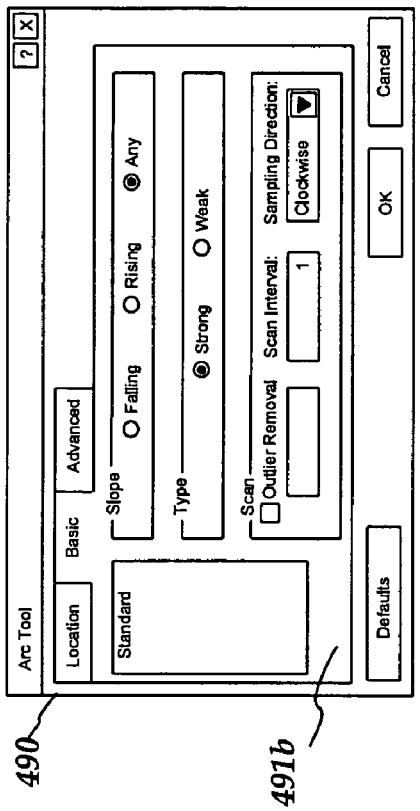
FIGS. 4A-4C are diagrams illustrating various features and operating parameters associated with an arc tool.
Figure 4A:
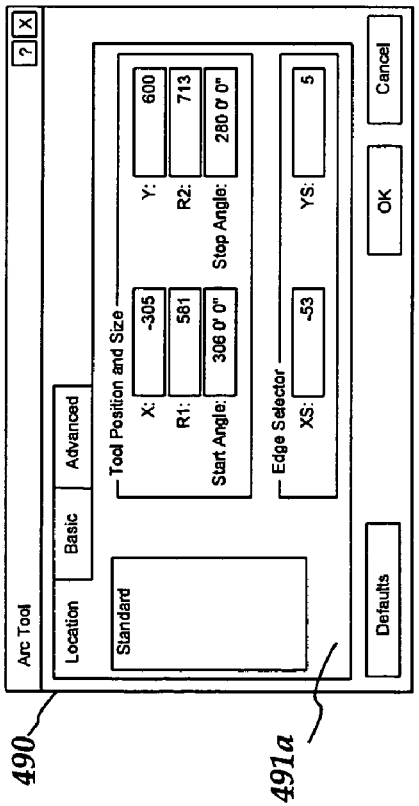
Figure 4C:
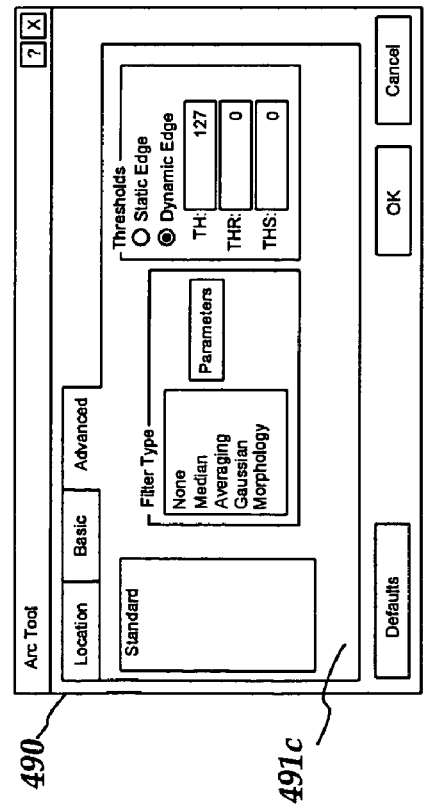

FIGS. 4A-4C are diagrams illustrating various features of one embodiment of the arc tool parameter dialog box 490. A tabbed dialog box configuration is illustrated, which includes user-selectable tabbed portions 491a, 491b, and 491c. FIG. 4A illustrates the tabbed portion 491a, which may reflect the X and Y coordinates of the center of curvature of the arc tool, the inner and outer radii of the arc tool ROI, denoted R1 and R2, respectively, as well as the start and stop angles of the defined ROI. The start and stop angles correspond to the orientations of the end portions of an arc tool ROI boundary. In one embodiment the start and stop angles may be defined about the nominal center of the radius of curvature of an arc tool, and in a counterclockwise direction relative to a horizontal reference axis in an image, for example. These values may be determined by graphical definition of the ROI as described further below, and/or they may be entered directly in the dialog box. The tabbed portion 491a may also reflect the coordinates XS and YS of the edge selector 416 (described below with reference to FIG. 5B).

FIG. 4B illustrates tabbed portion 491b, which reflects the edge search parameters to be employed within the selected ROI. The tabbed portion 491b may reflect a slope parameter type that specifies whether the edge intensity profile is to exhibit a falling slope (light to dark), a rising slope (dark to light) or any (either) slope when proceeding along the arc edge detection scan line direction indicated by the arc tool, as described further below. The tabbed portion 491b may reflect a parameter type that specifies whether the edge intensity profile corresponds to a strong edge or a weak edge. Strong edge search criteria may be more stringent to insure higher reliability in the resulting detection. Conversely, weak edge search criteria sacrifice some reliability, in order to make it more likely that the weak edge will be identified. The tabbed portion 491b may also reflect scan parameters that are used for identifying points along the arc edge in the ROI. Outlier removal may cause geometrically deviant points to be rejected, a scan interval value may cause points to be identified at a spacing of 1 degree, or 5 degrees, etc., and a clockwise or counterclockwise sampling direction may be specified for proceeding with the edge scans.

FIG. 4C illustrates tabbed portion 491c, which includes a portion that allows selection of a type of filter that may be applied to the image data in the ROI before performing edge detection. The embodiment shown in FIG. 4C allows the user to select one of four filter types or no filter at all. The user may select a median, an averaging, a Gaussian or a morphology filter. The tabbed portion 491c also includes a portion that reflects edge detection threshold values that may govern edge detection operations. The embodiment shown in FIG. 4C allows selection of either a static or a dynamic edge threshold. The user may specify three values TH, THR, and THS. The static threshold value TH defines the mean pixel intensity of the pixels that define an edge. The dynamic threshold value THR modifies the value THS at run time. The edge strength threshold value THS defines the minimum acceptance threshold for the difference in gray scale intensity of the pixels that define the edge of the surface. These thresholds determine whether an edge point is identified along an edge intensity scan line, or whether a scan "fails."

For all the tabbed portions 491a-491c, the Defaults button at the bottom restores the entries on the tabbed portions 491b and 491c to their default values, the OK button accepts the current parameters and closes the arc tool parameter dialog box 490, and the Cancel button returns all parameters to their state before the current editing sequence began and closes the dialog box 490.

FIGS. 5A and 5B are diagrams illustrating various features related to arc tool user interface according to this invention. FIG. 5A illustrates one embodiment of a tool and/or mode selection bar 570, including an arc tool activation button or icon 540. The arc tool button 540 may comprise an "on-off" indicator, such as an indicator box 541 that may appear surrounding the arc tool button or icon when it is active. When a user clicks on the arc tool button 540 it becomes active, and the user may create one of more instances of the arc tool 400 in the FOV window 310, as described below. The arc tool button 540 becomes inactive when a different button is clicked on the tool and/or mode selection bar 570, or another incompatible action is initiated by the user.

FIG. 5B shows the FOV window 310 and illustrates various features of one embodiment of the arc tool 400. Except as otherwise described herein, the FOV window 310, and/or the arc tool 400 in the FOV window 310, may operate according to known methods used in commercial systems, if desired. FIG. 5B represents an initial state of one instance of the arc tool 400, just after its initial drawing or creation. In one embodiment, the instance of the arc tool 400 is created, with the arc tool button 540 active, by positioning a cursor at one point in the FOV window 310, depressing the left mouse button, "dragging" the cursor (e.g., approximately as indicated by the length and direction of the arrow 591 shown in FIG. 5B), and finally releasing the button to create the initial state of the arc tool 400. Generally, it is desirable that the cursor be dragged across the edge, e.g., the edge 317', that is to be inspected using the tool. This generally places the edge within a ROI 402 that defines the portion of the image that is processed by the operations of the arc tool. It should be noted that the arrow 591 is generally not part of the user interface, but is shown here only for purposes of explanation.

As shown in FIG. 5B, the arc tool 400 may include the ROI 402, which is defined by a ROI boundary 410 having portions comprising an inner radius 410in, an outer radius 410out, and first and second ends 410e and 410e' at respective stop and start angles. Also shown are scan direction indicators 412 and 412', edge slope indicator 414, sampling direction indicator 418, and edge selector 416. The edge selector may be positioned by the user, e.g., by dragging it to a desired position along the edge 317', to define a "typical" portion of an edge. The actual edge profile at the location of the edge selector then provides the basis for defining specific edge profile intensity characteristics that aid in reliable edge detection. The scan direction indicators 412 and 412', may comprise arrowheads located along the end portions 410e and 410e', as shown. The arrowheads are configured to point in the direction corresponding to the sequence that is to be used for the analysis of pixel intensity that is used for detecting the edge in an image. It is generally advantageous if the scan direction proceeds from the least textured or "noisy" side of an edge or boundary to the more noisy side of the edge. The edge slope indicator 414 may generally be filled in an arc tool is trained, to indicate whether the intensity rises or falls across an edge, as described in greater detail below with reference to FIG. 14.

Figure 6:
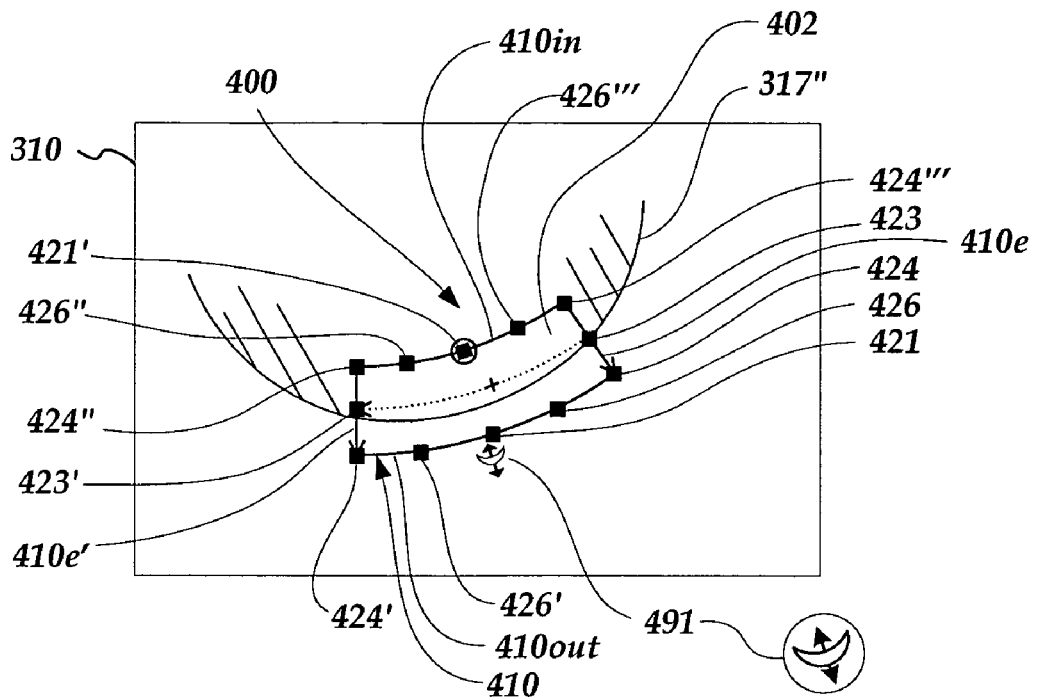
FIG. 6 is a diagram illustrating one embodiment of an arc tool user interface according to this invention, including various tool editing features.

FIG. 6 is a diagram illustrating another instance of the FOV window 310 and illustrates various additional features of one embodiment of the arc tool 400. FIG. 6 represents a state of one instance of the arc tool 400, wherein the arc tool 400 has been selected for editing after its creation. In one embodiment, an arc tool 400 is selected for editing by positioning a cursor in the ROI 402, or on the ROI boundary 410, and clicking the left mouse button. When the arc tool 400 has been selected for editing, initially, various editing handles appear (e.g., small boxes positioned on the ROI boundary 410). The editing handles may be "dragged" by using an input device in a known manner, and/or otherwise operated as described herein, in order to modify the ROI parameters of the arc tool 400. Thus, the editing handles are one type of ROI parameter control feature that may be included in an arc tool GUI according to this invention.

According to this invention, various parameter ROI parameter control features may be of distinct "types" and/or perform distinct operations, depending on their locations. For example, as shown in FIG. 6, the arc tool 400 may include a first type of editing handles 421-421', which may be located near the middle of the outer radius 410out and inner radius 410in, respectively. These editing handles may operate as described further below with reference to FIG. 6, and also as described with reference to FIGS. 7, 8A-8C, and 13. A second type of editing handles 423 and 423', maybe located near the middle of the end portions 410e' and 410e. These editing handles may operate as described further below with reference to FIGS. 10 and 11. A third type of editing handles 424-424''', may be located at the corners of the ROI boundary 410. In one embodiment, the third type of editing handles may operate as described further below with reference to FIGS. 9 and 13. A fourth type of editing handles 426-426''', may be located at two positions on each of the outer radius 410out and inner radius 410in, inward from the corners of the ROI boundary 410. Stated another way, they may be located between the first type of editing handles 421-421' and the third type of editing handles 424-424'''. In one embodiment, the fourth type of editing handles may operate as described further below with reference to FIGS. 12 and 13.

In one embodiment according to this invention, the different types of editing handles (or more generally, the different types of ROI parameter control features) that perform distinct operations may be associated with corresponding distinct mode symbol cursors that are activated under certain conditions to become the cursor or mouse-pointer in the FOV window 310. Various generic GUI operations, e.g., a drag operation, and/or right mouse button click, or the like, may have a different result depending on the underlying type of ROI parameter control feature that is associated with the operation. For example, a drag operation associated with a first distinct type of ROI parameter control feature may cause two opposing ROI boundaries to move in opposite directions, while of a drag operation associated with a second distinct type of ROI parameter control feature may cause two opposing ROI boundaries change their radii of curvature by the same amount. In various embodiments, a distinct mode symbol cursor may be displayed to cue the user regarding the type of ROI parameter control feature that is currently being used and/or the specific result that may be expected from one of the generic GUI operations.

In various embodiments, hovering with the default cursor or mouse-pointer over a particular type of editing handle for a predefined time may cause the corresponding mode symbol cursor to replace the default cursor. Once such a mode symbol cursor is displayed, the user may then actually activate the corresponding mode in order to perform the corresponding type of tool editing or modification operation. In various embodiments, the mode is activated by the operator performing a mode triggering action, e.g., clicking and/or holding down the left mouse button, after the mode symbol cursor has been displayed. FIG. 6 shows one embodiment of a curvature-changing mode symbol cursor 491 that is associated with the first type of editing handles 421-421'. In various embodiments, the user may cause the curvature-changing mode symbol cursor 491 to be displayed by positioning the mouse cursor to hover over one of the editing handles 421 or 421' for a predefined time. In various embodiments, the editing handles may disappear when a mode symbol cursor such as the curvature-changing mode symbol cursor 491 is displayed. Various curvature-changing mode features and operations are described in greater detail with reference to FIGS. 7 and 8A-8C.

Figure 7:
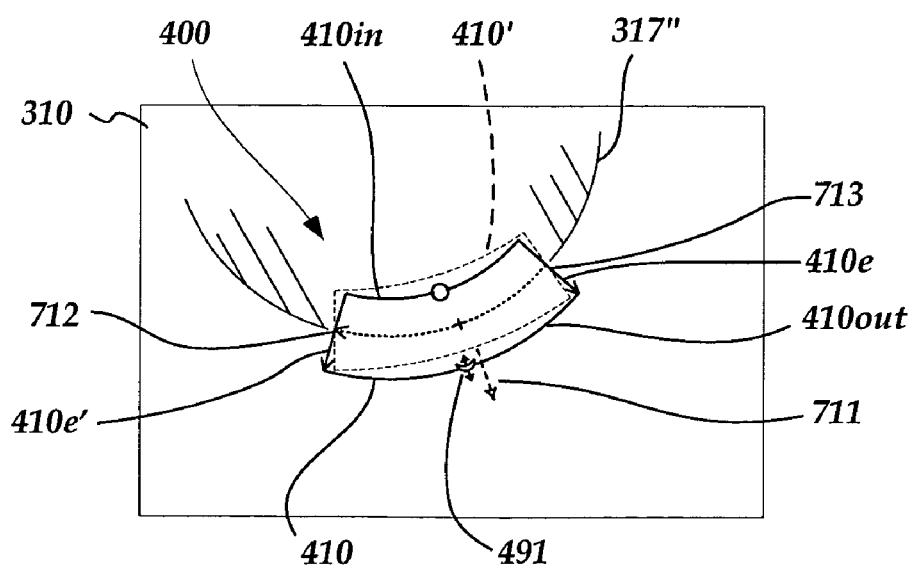
FIG. 7 is a diagram illustrating one embodiment of an arc tool user interface according to this invention, including curvature adjustment features.
Figure 8A:
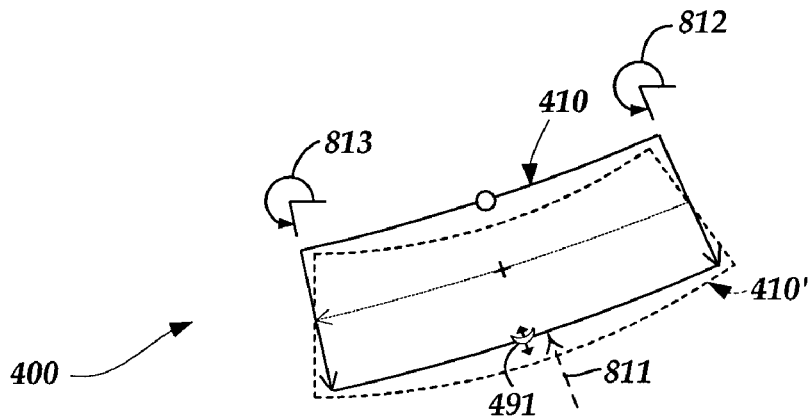
FIGS. 8A-8C are diagrams illustrating one embodiment of an arc tool user interface according to this invention, including some exemplary curvature adjustment limits.

FIG. 7 is a diagram illustrating one embodiment of various additional curvature-changing mode features and operations in an arc tool user interface according to this invention. FIG. 7 represents a state of one instance of the arc tool 400 after the curvature-changing mode associated with the first type of editing handles 421-421' has been activated, after the curvature-changing mode symbol cursor 491 is displayed. As illustrated in FIG. 7, subsequent to activation, moving the curvature-changing mode symbol cursor 491 away from the center of curvature (e.g., by the dragging the cursor while depressing the left mouse button), along a radial direction approximately indicated by the arrow 711, causes the nominal radius of curvature of the outer radius 410out and inner radius 410in to mutually decrease (causing an increase in their apparent curvature). In FIG. 7, the dashed-line boundary 410' corresponds to the state of the arc tool 400 before the cursor motion, and the solid-line boundary 410 corresponds to the state of the arc tool 400 after the cursor motion. It should be appreciated that if the curvature-changing mode symbol cursor 491 were moved toward the center of curvature instead of away from the center of curvature, then the nominal radius of curvature of the outer radius 410out and inner radius 410in would mutually increase, as generally shown in FIG. 8A. In various embodiments, the curvature-changing mode of the arc tool 400 operates such that the end portions 410e' and 410e, retain their original length and pivot about their midpoints 712 and 713, respectively, as the nominal radius of curvature changes. That is, the end portions 410e' and 410e act as though they are "pinned" at their midpoints. However, this behavior is exemplary only, and not limiting. When the radius of curvature of the arc tool 400 reaches a desired state, that editing operation may be completed and the curvature-changing mode may be deactivated (e.g., by releasing a mouse button that was depressed in order to drag the cursor 491). At that time, in various embodiments, the editing handles and/or other ROI parameter control features of the arc tool 400 may reappear in its GUI, such that other types of editing operations may be performed.

Figure 8B:
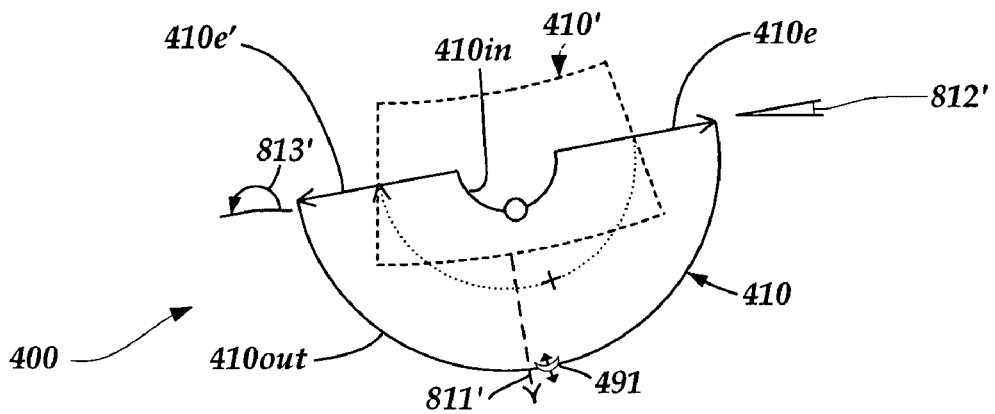
Figure 8C:
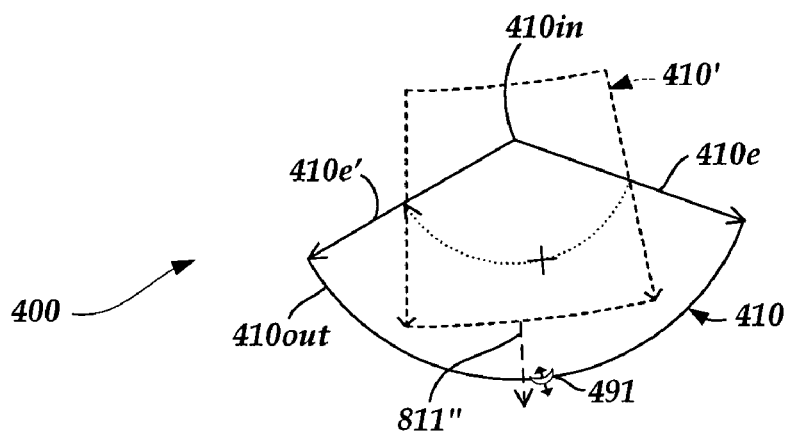

FIGS. 8A-8C are diagrams illustrating one embodiment of various additional curvature-changing mode features and operations in an arc tool according to this invention. In particular, FIGS. 8A-8C represent the limiting states of various allowed geometry changes for the curvature-changing mode of one embodiment of the arc tool 400. In FIGS. 8A-8C, the dashed-line boundaries 410' correspond to the state of the arc tool 400 before the cursor motion, and the solid-line boundaries 410 correspond to the state of the arc tool 400 after the cursor motion.

FIG. 8A illustrates a limiting state of the arc tool 400 as the curvature-changing mode symbol cursor 491 is moved radially inward, along a direction approximately indicated by the arrow 811, causing the nominal radius of curvature of the outer radius 410out and inner radius 410in to mutually increase. In various embodiments, the minimum allowed difference between the stop angle 812 and the start angle 813 of the arc tool 400 is 5 degrees. In other embodiments, the minimum is 7 degrees. Such a minimum tends to increase the reliability of the geometric operations of the arc tool 400. When the arc tool 400 includes such a minimum, in various embodiments, motions of the curvature-changing mode symbol cursor 491 that would otherwise cause the minimum to be violated, are ignored and/or not permitted.

FIGS. 8B and 8C illustrate two limiting states of the arc tool 400 as the curvature-changing mode symbol cursor 491 is moved radially outward, along a direction approximately indicated by the arrow 811', causing the nominal radius of curvature of the outer radius 410out and inner radius 410in to mutually decrease. As shown in FIG. 8B, in various embodiments, the maximum allowed difference between the stop angle 812' and the start angle 813' of the arc tool 400 that may be set using the curvature-changing mode symbol cursor 491 is approximately 180 degrees, or somewhat less. As shown in FIG. 8C, in various embodiments, the minimum allowed radius of curvature of the inner radius 410in is zero units. When the arc tool 400 includes such limits, in various embodiments, motions of the curvature-changing mode cursor 491 that would otherwise cause the limits to be violated, are ignored and/or not permitted. Such limits avoid ROI distortions and related programming complexity in embodiments of the arc tool 400 wherein the end portions 410e and 410e' are pinned at their midpoints during the curvature-changing mode. For similar reasons, in various embodiments, if an instance of an arc tool is created with a difference of more than approximately 180 degrees between its start and stop angles, display of the editing handles 421 or 421' may be suppressed, and the associated curvature-changing mode outlined above may be disabled.

FIGS. 9-13 are diagrams illustrating exemplary embodiments of various additional features and operations in an arc tool according to this invention. In each of the these figures, the dashed-line boundaries 410' correspond to the state of the arc tool 400 before the cursor motion, and the solid-line boundaries 410 correspond to the state of the arc tool 400 after the cursor motion.

Figure 9:
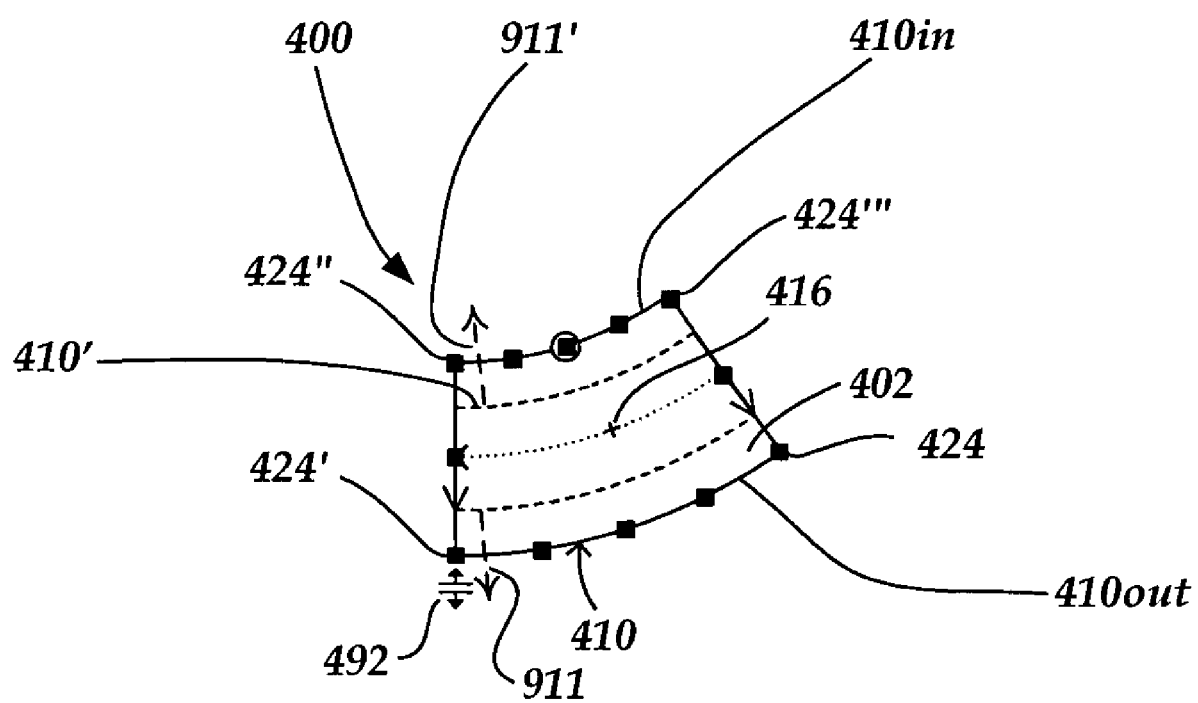
FIG. 9 is a diagram illustrating one embodiment of an arc tool user interface according to this invention, including a set of symmetrical radii adjustment features.

FIG. 9 is a diagram illustrating one embodiment of various features and operations of a symmetrical radial dimension changing mode in an arc tool user interface according to this invention. FIG. 9 represents a state of one instance of the arc tool 400 after a symmetrical radial dimension changing mode associated with the third type of editing handles 424-424''' has been activated, e.g., after a symmetrical radial dimension changing mode symbol cursor 492 is displayed. As illustrated in FIG. 9, subsequent to activation, moving the symmetrical radial dimension changing mode symbol cursor 492 away from the center of curvature (e.g., by the dragging the cursor while depressing the left mouse button), along a radial direction approximately indicated by the arrow 911, causes the nominal radius of curvature of the outer radius 410out to increase and that of the inner radius 410in to decrease symmetrically, that is, by the same amount. When the radial dimension of the arc tool 400 reaches a desired state, that editing operation may be completed and the symmetrical radial dimension changing mode may be deactivated (e.g., by releasing a mouse button that was depressed in order to drag the mode symbol cursor 492).

This type of operation is advantageous for changing the radial dimension of the ROI 402, while its centerline may remain properly located on or near an edge feature (not shown) that is centrally located in the ROI 402. Of course, it should be appreciated that if the symmetrical radial dimension changing mode symbol cursor 492 were dragged along the direction opposite to that indicated by the arrow 911, then the nominal radius of curvature of the outer radius 410out would decrease and that of the inner radius 410in would increase symmetrically. In various embodiments, if the user hovered the default cursor over the editing handle 424" instead of the editing handle 424', the mode symbol cursor 492 would be displayed proximate to that editing handle, and dragging that instance of the mode symbol cursor 492 along the direction indicated by the arrow 911', would also have the effect illustrated in FIG. 9, and so on for the editing handles 424 and 424'''.

Figure 10:
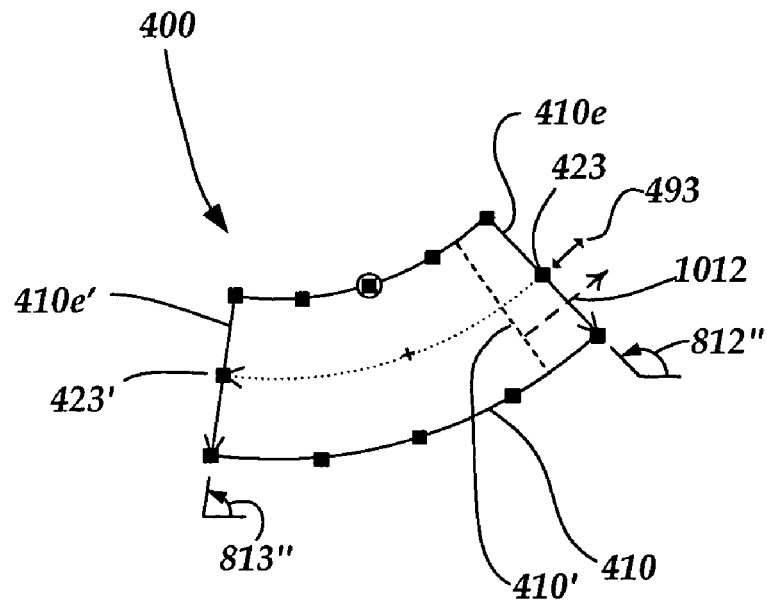
FIG. 10 is a diagram illustrating one embodiment of an arc tool user interface according to this invention, including a set of stop/start angle adjustment features.

FIG. 10 is a diagram illustrating one embodiment of various features and operations of an individual start/stop angle changing mode in an arc tool user interface according to this invention. FIG. 10 represents a state of one instance of the arc tool 400 after an individual start/stop angle changing mode associated with the second type of editing handles 423-423' has been activated, e.g., after an individual start/stop angle changing mode symbol cursor 493 is displayed. As illustrated in FIG. 10, subsequent to activation, moving the individual start/stop angle changing mode symbol cursor 493 (e.g., by the dragging the cursor while depressing the left mouse button), along a tangential direction approximately indicated by the arrow 1012, causes the stop angle 812" (for the end portion 410e) to change as shown. Moving the cursor in the opposite direction would cause the stop angle 812" to move in the opposite direction. In various embodiments, if the user hovered the default cursor over the editing handle 423' instead of the editing handle 423, the mode symbol cursor 493 would be displayed proximate to that editing handle 423' where it would instead control the start angle 813" (for the end portion 410e') in an analogous manner. When the start (or stop) angle of the arc tool 400 reaches a desired state, that editing operation may be completed and the individual start/stop angle changing mode may be deactivated (e.g., by releasing a mouse button that was depressed in order to drag the mode symbol cursor 493).

Figure 11:
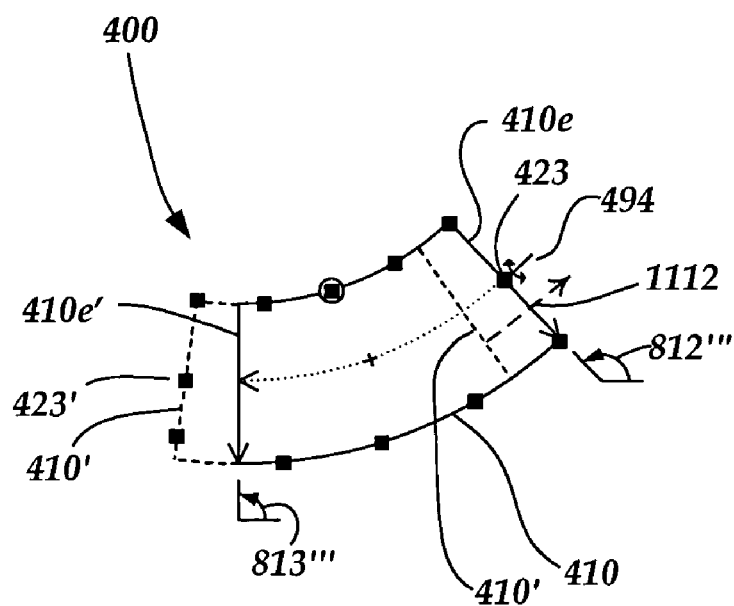
FIG. 11 is a diagram illustrating one embodiment of an arc tool user interface according to this invention, including a set of features for rotating the tool about the center of its radius of curvature.

FIG. 11 is a diagram illustrating one embodiment of various features and operations of a rotation about center of curvature mode (RACOC mode) in an arc tool user interface according to this invention. FIG. 11 represents a state of one instance of the arc tool 400 after a RACOC mode associated with the second type of editing handles 423-423' has been activated, e.g., after a RACOC mode symbol cursor 494 is displayed. In various embodiments, a RACOC mode symbol cursor 494 is displayed and the mode is activated simultaneously by depressing the right mouse button. As shown in FIG. 11, subsequent to activation, moving the RACOC mode symbol cursor 494 (e.g., by the dragging the cursor while depressing the right mouse button), along a tangential direction approximately indicated by the arrow 1112, causes the stop angle 812''' (for the end portion 410e) and the start angle 813''' (for the end portion 410e') to change by the same amount as shown. As indicated by the mode name, the ROI boundary 410 behaves as if it were rotated about the center of the radii of curvature of the arc tool 400. Moving the cursor in the opposite direction would cause rotation in the opposite direction about the center of the radii of curvature. In various embodiments, if the user hovered the default cursor over the editing handle 423' instead of the editing handle 423, the mode symbol cursor 494 would be displayed proximate to that editing handle 423' where it would operate in an analogous manner. When the rotation of the arc tool 400 about the center of the radii of curvature reaches a desired state, that editing operation may be completed and the RACOC mode may be deactivated (e.g., by releasing a mouse button that was depressed in order to drag the mode symbol cursor 494).

Figure 12:
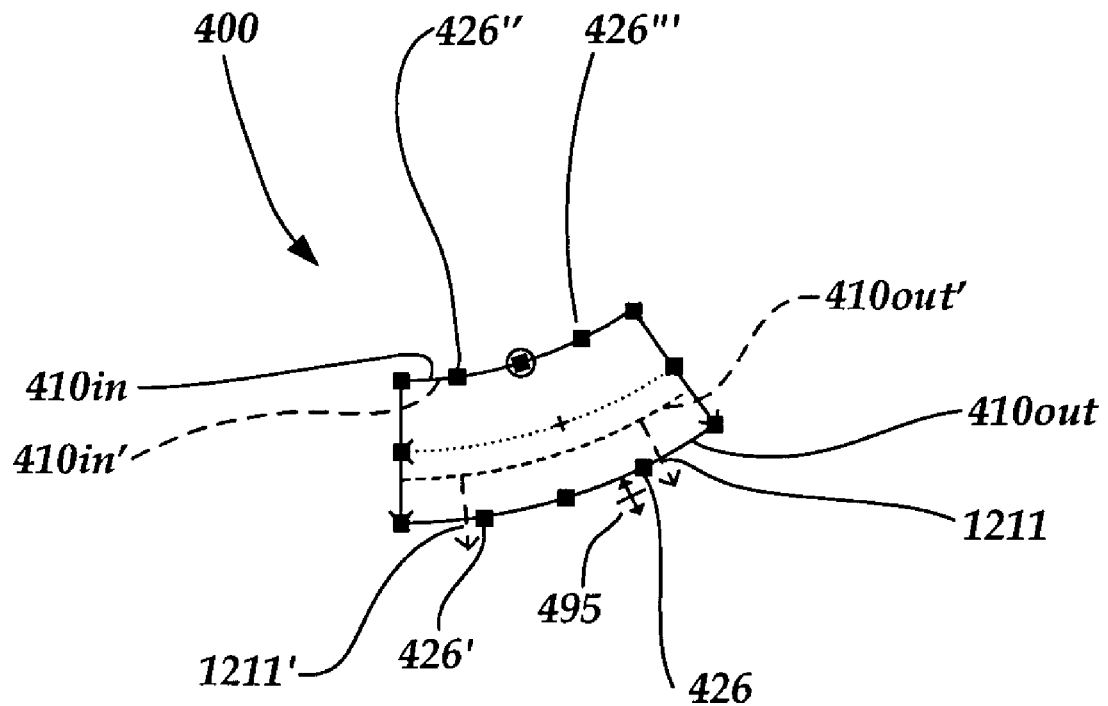
FIG. 12 is a diagram illustrating one embodiment of an arc tool user interface according to this invention, including a set of individual radii adjustment features.

FIG. 12 is a diagram illustrating one embodiment of various features and operations of an individual radius changing mode in an arc tool user interface according to this invention. FIG. 12 represents a state of one instance of the arc tool 400 after an individual radius changing mode associated with the fourth type of editing handles 426-426''' has been activated, e.g., after an individual radius changing mode symbol cursor 495 is displayed. As illustrated in FIG. 12, subsequent to activation, moving the individual radius changing mode symbol cursor 495 away from the center of curvature (e.g., by the dragging the cursor while depressing the left mouse button), along a radial direction approximately indicated by the arrow 1211 (or 1211'), causes the nominal radius of curvature of the outer radius 410out to increase. An opposite drag direction would have an opposite effect on the outer radius 410out. In various embodiments, if the user hovered the default cursor over the editing handle 426" or 426''' (instead of the editing handles 426 or 426'), the mode symbol cursor 495 would be displayed proximate to the editing handle 426" or 426''', where it would operate to control the inner radius 410in in an analogous manner. When the controlled radius of the arc tool 400 reaches a desired state, that editing operation may be completed and the individual radius changing mode may be deactivated (e.g., by releasing a mouse button that was depressed in order to drag the mode symbol cursor 495).

Figure 13:
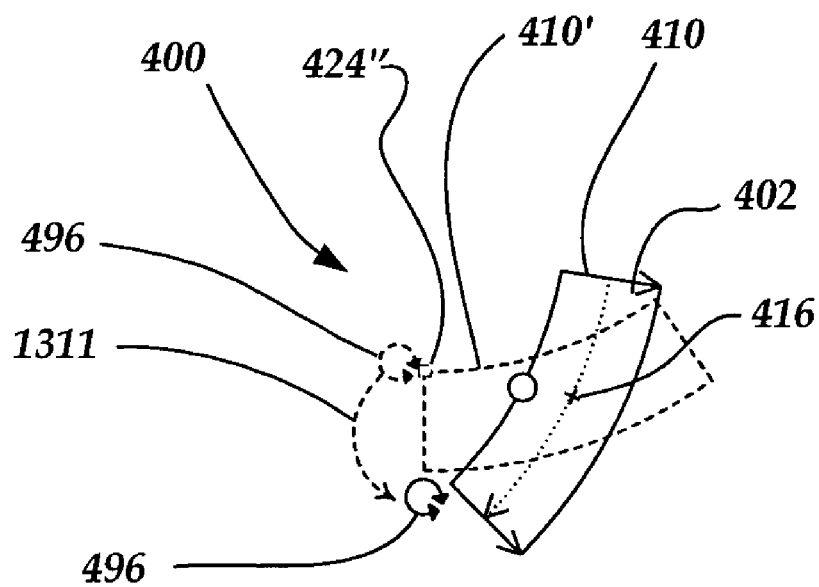
FIG. 13 is a diagram illustrating one embodiment of an arc tool user interface according to this invention, including a set of arc tool rotational adjustment features.

FIG. 13 is a diagram illustrating one embodiment of various features and operations of an in-place ROI rotation mode in an arc tool user interface according to this invention. In various embodiments, the operations of the in-place ROI rotation mode may be performed using any of the previously-described editing handle types, except for the second type of editing handles 423-423'. The example shown in FIG. 13 represents a state of one instance of the arc tool 400 after the in-place ROI rotation mode has been activated using the editing handle 424". In various embodiments, the in-place ROI rotation mode symbol cursor 496 is displayed and the mode is activated simultaneously by depressing the right mouse button with the default cursor on one of the appropriate types of editing handles. In various embodiments, the editing handles may disappear when the in-place ROI rotation mode is activated. As shown in FIG. 13, subsequent to activation, moving the in-place ROI rotation mode symbol cursor 496 (e.g., by the dragging the cursor while depressing the right mouse button), along a path approximately indicated by the arrow 1311, causes the ROI 402 to rotate. In one embodiment, if the cursor 496 follows a path that is generally clockwise (or counter-clockwise) about the center of the ROI 402, then the ROI 402 rotates in a generally clockwise (or counterclockwise) direction. In one embodiment, the center of rotation of the ROI 402 may coincide with the geometric center of the ROI. In another embodiment, the center of rotation of the ROI 402 may coincide with the location of the edge selector 416. When the rotation of the arc tool 400 reaches a desired state, that editing operation may be completed and the in-place ROI rotation mode may be deactivated (e.g., by releasing a mouse button that was depressed in order to drag the mode symbol cursor 496). At that time, in various embodiments, the editing handles and/or other parameter control features of the arc tool 400 may reappear in its GUI, such that other types of editing operations may be performed.

Figure 14:
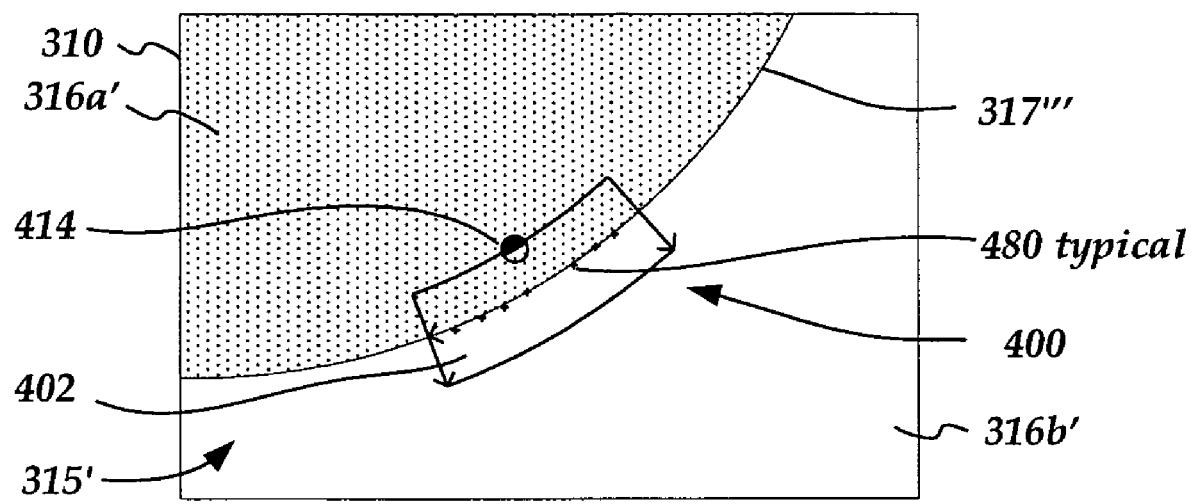
FIG. 14 is a diagram illustrating one embodiment of a "run" arc tool according to this invention.

FIG. 14 is a diagram illustrating one embodiment of a "run" arc tool 400 according to this invention. FIG. 14 represents a state of the arc tool 400 after a user has adjusted its ROI parameters and other tool parameters to a desired state for detecting the workpiece edge 317''', and furthermore run the arc tool 400 to perform the edge detection. As a result, the detected edge points 480 are displayed in the GUI of the arc tool 400, and the edge slope indicator 414 displayed with a dark semicircle and a lighter semicircle oriented in a manner that corresponds to the relative orientation of the darker (lower intensity) and lighter (higher intensity) sides of the detected edge 317'''. In addition, various tool parameters outlined with reference to FIGS. 4A-4C, are determined based on the actual image characteristics of the edge 317''' in the ROI 402.

Figure 15:
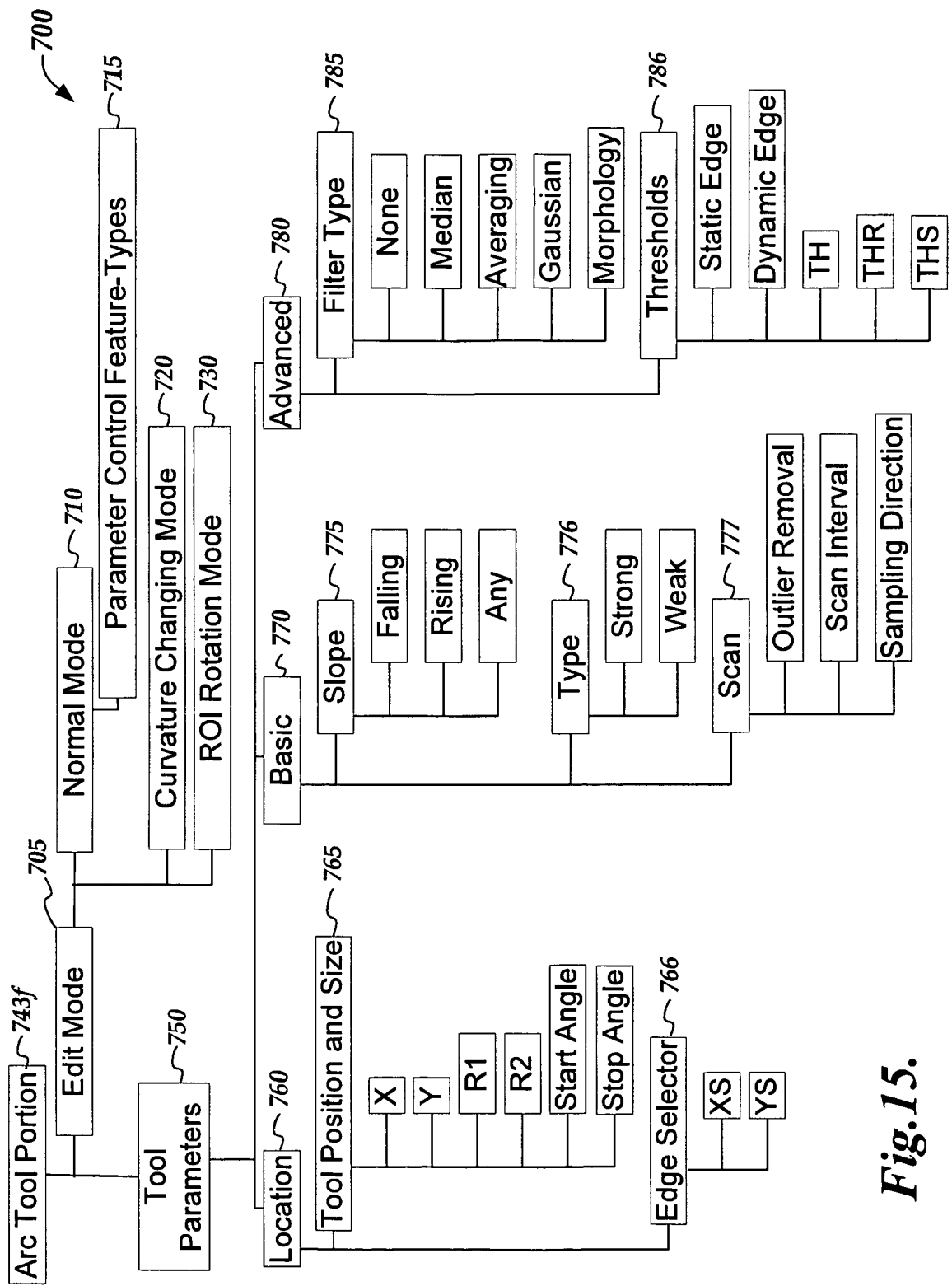
FIG. 15 is a block diagram illustrating various features and operating parameters associated with an arc tool according to this invention.

FIG. 15 is a block diagram 700 illustrating various features and operating parameters associated with an arc tool portion 743f according to this invention. In one embodiment, the features and operating parameters of the arc tool portion 743f may be implemented in the arc tool portion 143f, previously outlined with reference to FIG. 2. The various features and operating parameters may be implemented in hardware and/or software by any now-known or later-developed method. As shown in FIG. 15, the arc tool portion 743f may comprise an arc tool edit mode portion 705, and a tool parameters portion 750.

In the embodiment shown in FIG. 15, for each instance of an arc tool, the related arc tool parameters comprise location parameters 760, "basic" arc tool parameters 770, and "advanced" arc tool parameters 780. The location parameters 760 may include arc tool ROI position and size parameters 765 and edge selector parameters 766. The "basic" arc tool parameters 770 may include edge slope parameters 775, edge type parameters 776, and edge detection scan parameters 777. The "advanced" arc tool parameters 780 may include filter type parameters 785 and edge detection threshold parameters 786. The features of various exemplary embodiments of the parameters, parameter control features, and other user interface features corresponding to the elements 760, 770, and 780 have been outlined throughout the previous disclosure, and need not be repeated here.

In the embodiment shown in FIG. 15, arc tool edit mode portion 705 may comprise a normal mode portion 710, a curvature-changing mode portion 720, a ROI-rotation mode portion 730. The normal mode portion 710 may include a parameter control feature-type portion 715, that may define and control the characteristics and operations associated with each distinct type of parameter control feature that is included in an arc tool GUI and/or any associated menus, or the like. For example, in one embodiment, the parameter control feature-type portion may define and control the characteristics and operations associated with each of the four distinct types of editing handles, described previously with reference to FIGS. 6-13. The curvature-changing mode portion 720 and the ROI-rotation mode portion 730 may define and control the mode activation trigger characteristics and operations associated with their respective modes. The characteristics and editing operations associated with various exemplary types of parameter control features, and exemplary curvature-changing and ROI-rotation modes have been outlined throughout the previous disclosure, and need not be repeated here.

While exemplary user interface features and sequences of operations have been outlined when describing various exemplary embodiments of arc tools with reference to FIGS. 3-15, it will be appreciated that in other exemplary embodiments certain operations may be performed in other sequences and/or one or more of the described operating features or GUI features may be omitted, and the other inventive aspects of the methods and GUI's disclosed herein may still provide substantial benefits. Further, while the distinct types of ROI parameter control features have been described as being distinguished by their locations relative to the region of interest of an arc tool, alternatively, they may be distinguished by distinct display symbols, colors, or the like. Thus, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A non-transitory computer-readable medium containing a computer-executable program stored thereon for producing an arc tool graphical user interface (GUI) for measuring the characteristics of arc-shaped features for use in a machine vision inspection system comprising a control system portion and a display, the program, in response to execution, causing the machine vision inspection system to:
   display a region of interest boundary generally surrounding a region of interest (ROI), the ROI boundary comprising an inner radius boundary portion, an outer radius boundary portion, and first and second end portions; and
   provide, via the display, at least four distinct types of ROI parameter control features located proximate to at least two of the inner radius boundary portion, the outer radius boundary portion, and the first end portion,
   wherein:
     each of the at least four distinct types of ROI parameter control features is associated with a distinct mode of operation that is specific to that type of ROI parameter control feature; and
     one distinct mode of operation that is associated with a first type of ROI parameter control feature that is located proximate to at least one of the inner radius boundary portion and the outer radius boundary portion is a symmetrical radial dimension changing mode, wherein movement of a cursor associated with the first type of ROI parameter control feature along a radial direction causes the nominal radius of curvature of the ROI outer radius boundary portion to increase while the nominal radius of curvature of the ROI inner radius boundary portion simultaneously decreases, or vice versa, depending on the direction of the radial movement of the cursor associated with the first type of ROI parameter control feature.

2. A computer-readable medium according to claim 1, wherein one distinct mode of operation that is associated with a second type of ROI parameter control feature that is located proximate to at least one of the inner radius boundary portion and the outer radius boundary portion is a curvature-changing mode, wherein movement of a cursor associated with the second type of ROI parameter control feature along a radial direction causes the nominal radius of curvature of the ROI inner and outer radius boundary portions to mutually decrease or mutually increase depending on the direction of the radial movement of the cursor associated with the second type of ROI parameter control feature.

3. A computer-readable medium according to claim 2, wherein the cursor associated with the first type of ROI parameter control feature includes a distinct symmetrical radial dimension changing mode symbol and the cursor associated with the second type of ROI parameter control feature includes a distinct curvature-changing mode symbol.

4. A computer-readable medium according to claim 2, wherein movement of the cursor associated with the second type of ROI parameter control feature along a radial direction causes the nominal radius of curvature of the inner and outer radii of the ROI to mutually decrease or mutually increase by the same amount, while the first and second end portions pivot as though they are pinned at their midpoints.

5. A computer-readable medium according to claim 1, wherein at least one of the distinct types of ROI parameter control features comprises an editing handle and the editing handle is associated with at least two modes of operation, and a first one of the at least two modes of operation is activated by a first activation operation comprising hovering a default cursor over the editing handle until a distinct mode symbol cursor is displayed, and a second one of the at least two modes is activated by a second activation operation comprising positioning the default cursor at the editing handle and depressing a mouse button.

6. A computer-readable medium according to claim 5, wherein the at least two modes of operation comprise one of the distinct modes of operation and one shared mode of operation which is an in-place ROI rotation mode of operation, and wherein the arc tool GUI comprises an edge selector located within the ROI, and a center of rotation of the in-place ROI rotation mode of operation coincides with the location of the edge selector.

7. A computer-readable medium according to claim 1, wherein three distinct types of ROI parameter control features are located on each of the inner and outer radius boundaries of the ROI.

8. A computer-readable medium according to claim 7, wherein one distinct mode of operation that is associated with one of the distinct types of ROI parameter control features is at least one of:
    a distinct mode of operation that is associated with an ROI parameter control feature that is located proximate to the inner radius boundary portion, the distinct mode of operation being an individual radius changing mode for the inner radius boundary portion, wherein movement of a cursor associated with that type of ROI parameter control feature that is located proximate to the inner radius boundary portion along a radial direction causes the nominal radius of curvature of the inner radius boundary portion to either increase or decrease, depending on the direction of the radial movement of the cursor associated with that type of ROI parameter control feature that is located proximate to the inner radius boundary portion; and
    a distinct mode of operation that is associated with an ROI parameter control feature that is located proximate to the outer radius boundary portion, the distinct mode of operation being an individual radius changing mode for the outer radius boundary portion, wherein movement of a cursor associated with that type of ROI parameter control feature that is located proximate to the outer radius boundary portion along a radial direction causes the nominal radius of curvature of the outer radius boundary portion to either increase or decrease, depending on the direction of the radial movement of the cursor associated with that type of ROI parameter control feature that is located proximate to the outer radius boundary portion.

9. A machine vision inspection system, the system comprising:
    a camera system;
    a display;
    a control system portion; and
    a memory portion containing a program which, in response to execution using the control system portion, causes the control system portion to produce an arc tool graphical user interface (GUI) on the display for measuring the characteristics of arc-shaped features, the arc tool GUI comprising:
        a region of interest boundary generally surrounding a region of interest (ROI), the ROI boundary comprising an inner radius boundary portion, an outer radius boundary portion, and first and second end portions; and
        at least four distinct types of ROI parameter control features located proximate to at least two of the inner radius boundary portion, the outer radius boundary portion, and the first end portion,
        wherein:
            each of the at least four distinct types of ROI parameter control features is associated with a distinct mode of operation that is specific to that type of ROI parameter control feature; and
            one distinct mode of operation that is associated with a first type of ROI parameter control feature that is located proximate to at least one of the inner radius boundary portion and the outer radius boundary portion is a symmetrical radial dimension changing mode, wherein movement of a cursor associated with the first type of ROI parameter control feature along a radial direction causes the nominal radius of curvature of the ROI outer radius boundary portion to increase while the nominal radius of curvature of the ROI inner radius boundary portion simultaneously decreases, or vice versa, depending on the direction of the radial movement of the cursor associated with the first type of ROI parameter control feature.

10. A machine vision inspection system according to claim 9, wherein the distinct types of ROI parameter control features are distinguished by at least one of (a) distinct mode symbols and (b) both their distinct mode symbols and their locations.

11. A machine vision inspection system according to claim 9, wherein when the nominal radius of curvature of the ROI inner and outer radius boundary portions are changed, the first and second end portions retain their original angles and midpoints.

12. A machine vision inspection system according to claim 9, wherein one distinct mode of operation that is associated with a second type of ROI parameter control feature that is located proximate to at least one of the inner radius boundary portion and the outer radius boundary portion is a curvature-changing mode, wherein movement of a cursor associated with the second type of ROI parameter control feature along a radial direction causes the nominal radius of curvature of the ROI inner and outer radius boundary portions to mutually decrease or mutually increase depending on the direction of the radial movement of the cursor associated with the second type of ROI parameter control feature.

13. A machine vision inspection system according to claim 12, wherein the cursor associated with the first type of ROI parameter control feature includes a distinct symmetrical radial dimension changing mode symbol and the cursor associated with the second type of ROI parameter control feature includes a distinct curvature-changing mode symbol.

14. A machine vision inspection system according to claim 12, wherein movement of the cursor associated with the second type of ROI parameter control feature along a radial direction causes the nominal radius of curvature of the inner and outer radii of the ROI to mutually decrease or mutually increase by the same amount, while the first and second end portions pivot as though they are pinned at their midpoints.

15. A machine vision inspection system according to claim 12, wherein when the difference between the start and stop angles of an ROI is approximately 180 degrees or more, the curvature-changing mode is disabled for that ROI.

16. A machine vision inspection system according to claim 9, wherein at least one of the distinct types of ROI parameter control features comprises an editing handle and the editing handle is associated with at least two modes of operation.

17. A machine vision inspection system according to claim 16, wherein the at least two modes of operation comprise one of the distinct modes of operation and one shared mode of operation which is an in-place ROI rotation mode of operation, and the arc tool GUI comprises an edge selector located within the ROI, and a center of rotation of the in-place ROI rotation mode of operation coincides with the location of the edge selector.

18. A machine vision inspection system according to claim 16, wherein a first one of the at least two modes of operation is activated by a first activation operation comprising hovering a default cursor over the editing handle until a distinct mode symbol cursor is displayed, and a second one of the at least two modes is activated by a second activation operation comprising positioning the default cursor at the editing handle and depressing a mouse button.

19. A machine vision inspection system according to claim 9, wherein three distinct types of ROI parameter control features are located on each of the inner and outer radius boundaries of the ROI.

20. A machine vision inspection system according to claim 19, wherein one distinct mode of operation that is associated with one of the distinct types of ROI parameter control features is at least one of:

a distinct mode of operation that is associated with an ROI parameter control feature that is located proximate to the inner radius boundary portion, the distinct mode of operation being an individual radius changing mode for the inner radius boundary portion, wherein movement of a cursor associated with that type of ROI parameter control feature that is located proximate to the inner radius boundary portion along a radial direction causes the nominal radius of curvature of the inner radius boundary portion to either increase or decrease, depending on the direction of the radial movement of the cursor associated with that type of ROI parameter control feature that is located proximate to the inner radius boundary portion; and a distinct mode of operation that is associated with an ROI parameter control feature that is located proximate to the outer radius boundary portion, the distinct mode of operation being an individual radius changing mode for the outer radius boundary portion, wherein movement of a cursor associated with that type of ROI parameter control feature that is located proximate to the outer radius boundary portion along a radial direction causes the nominal radius of curvature of the outer radius boundary portion to either increase or decrease, depending on the direction of the radial movement of the cursor associated with that type of ROI parameter control feature that is located proximate to the outer radius boundary portion.

* * * * *